(12) United States Patent
Narita et al.

(10) Patent No.: US 6,899,926 B2
(45) Date of Patent: May 31, 2005

(54) ALLOY COATING, METHOD FOR FORMING THE SAME, AND MEMBER FOR HIGH TEMPERATURE APPARATUSES

(75) Inventors: Toshio Narita, 7-8, Shinkotoni 1-jo 9-chome, Sapporo-shi, Hokkaido (JP); Shigenari Hayashi, Sapporo (JP); Hiroshi Yakuwa, Fujisawa (JP); Manabu Noguchi, Yokohama (JP); Matsuho Miyasaka, Yokohama (JP)

(73) Assignees: EBARA Corporation, Tokyo (JP); Toshio Narita, Sapporo (JP)

( * ) Notice: Subject to any disclaimer, the term of this patent is extended or adjusted under 35 U.S.C. 154(b) by 0 days.

(21) Appl. No.: 10/839,161

(22) Filed: May 6, 2004

(65) Prior Publication Data

US 2005/0079089 A1 Apr. 14, 2005

Related U.S. Application Data

(62) Division of application No. 09/799,036, filed on Mar. 6, 2001, now Pat. No. 6,830,827.

(30) Foreign Application Priority Data

Mar. 7, 2000 (JP) ........................................ 2000-062613

(51) Int. Cl.[7] .............................. C23C 2/04; C23C 2/02; B32B 15/01
(52) U.S. Cl. ....................... 427/431; 427/436; 420/416; 420/427; 420/430; 420/433
(58) Field of Search ................................ 427/431, 436; 420/416, 427, 430, 433; 428/661, 660, 629, 670, 621

(56) References Cited

U.S. PATENT DOCUMENTS

| | | |
|---|---|---|
| 3,668,083 A | 6/1972 | Meyer et al. ................. 204/43 |
| 4,517,253 A | 5/1985 | Rose et al. .................. 428/620 |
| 4,731,253 A | 3/1988 | DuBois ........................ 427/34 |
| 5,273,712 A | 12/1993 | Czech et al. .................. 420/40 |
| 5,395,221 A | 3/1995 | Tucker, Jr. et al. ........... 418/48 |
| 5,427,866 A | 6/1995 | Nagaraj et al. .............. 428/610 |
| 5,556,713 A | 9/1996 | Leverant ..................... 428/610 |
| 5,817,371 A | 10/1998 | Gupta et al. ................. 427/454 |
| 6,004,372 A | 12/1999 | Quets .......................... 75/255 |
| 6,020,075 A | 2/2000 | Gupta et al. ................. 428/612 |

(Continued)

FOREIGN PATENT DOCUMENTS

| | | |
|---|---|---|
| EP | 0 814 178 A1 | 12/1997 |
| FR | 1.385.594 | 1/1965 |
| GB | 385859 | 1/1933 |
| JP | 61099925 | 5/1986 |
| JP | 61144025 | 7/1986 |
| JP | 10-168556 | 6/1998 |
| JP | 11350196 | 12/1999 |
| WO | WO 99/23279 | 5/1999 |

OTHER PUBLICATIONS

R.A. Page et al., *Inhibition of Interdiffusion From MCrAlY Overlay Coatings by Application of a Ni–Re Interlayer*, Journal of Engineering for Gas Turbines and Power, vol. 121, pp. 313–319, Apr. 1999.

(Continued)

*Primary Examiner*—Deborah Jones
*Assistant Examiner*—Jason Savage
(74) *Attorney, Agent, or Firm*—Westerman, Hattori Daniels & Adrian, LLP (57) ABSTRACT

Disclosed is an alloy coating which can be advantageously applied to members for high temperature apparatuses so as to prolong the service life of the members. The alloy coating comprises an alloy. This alloy comprises: at least one member, as a base, selected from the group consisting of Re, Ir, Nb, Ta, Mo, and W; and at least one alloying element for imparting corrosion resistance. A method for forming the alloy coating, and a member for high temperature apparatuses, to which the alloy coating has been applied, are also disclosed.

8 Claims, 3 Drawing Sheets

U.S. PATENT DOCUMENTS

| | | | |
|---|---|---|---|
| 6,143,141 A | 11/2000 | Leverant et al. | 204/192.15 |
| 6,168,875 B1 | 1/2001 | Cybulsky et al. | 428/633 |
| 6,207,297 B1 | 3/2001 | Sabol et al. | 428/621 |
| 6,299,986 B1 | 10/2001 | Meelu | 428/615 |
| 6,306,524 B1 | 10/2001 | Spitsberg et al. | 428/621 |

OTHER PUBLICATIONS

Y. Zhang et al., *Synthesis and Cyclic Oxidation Behavior of a (Ni, Pt)Al Coating on a Desulfurized Ni–Base Superalloy*, Metallurgical and Materials Transaction A, vol. 30A, pp. 2379–2687, Oct. 1999.

G. Fisher et al., *An assessment of the oxidation resistance of an iridium and an iridium/platinum low–activity aluminide/MarM002 system at 1100°C*, Surface and Coating Technology 113, pp. 259–267, 1999.

H. Hosoda et al., *Smart Oxygen Diffusion Barrier Based on IrAl Alloy*, Mat. Res. Soc. Symp. Proc. vol. 552, KK8.33.1–KK8.33.7, 1999.

XP–002261160, Valeev, Z. I. et al., *Electrodeposition of molybdenum–niobium alloys from their chloride melt*, Elektrokhimiya (1988), 24(1), 59–63.

XP–002261161, Grinevich, V. V. et al., *Problem of tantalum coprecipitation during electrodeposition of niobium from molten salts*, Metally (1994), (3), 18–25.

XP–002261162, Buryak, N. I. et al., *Structure of metaphosphate melts with molybdenum(V) and tungsten(V) ions and electrodeposition of metals and alloys*, Ukrainskii Khimicheskii Zhurnal (Russian Edition) (1994), 60(3–4), 231–5.

XP–002261163, Baraboshkin, A. N. et al., *Electrodeposition of uniform layers of tungsten–rhenium alloys from a chloride melt*, Deposited Doc. (1979), VINITI 502–79, 72–3.

XP–002966859, Hisaaki Fukushima et al., *Electrodeposition of Re–Ni Alloys from Ammoniacal Citrate solution*, Kinzoku Hyomen Gijutsu, vol. 36, No. 5, 1985, pp. 198–203.

XP–002261164, Sato, Yuzuru et al., *Cathodic behavior of the deposition of Nb and Al in NaCl–AlCl3 melt*, Proceedings—Electrochemical Society (1996), 96–7 (Molten Salts), 179–188.

XP–002261165, Sarychev, S. Yu. et al., *The electrochemical behavior of cobalt and it codeposition with tungsten from oxide melts*, Ukrainskii Khimicheskii Zhurnal (Russian Edition) (2003), 69(3–4), 66–70.

ALLOY COATING, METHOD FOR FORMING THE SAME, AND MEMBER FOR HIGH TEMPERATURE APPARATUSES

This application is a divisional application of prior application Ser. No. 09/799,036 filed Mar. 6, 2001 now U.S. Pat. No. 6,830,827.

BACKGROUND OF THE INVENTION

1. Field of the Invention

The present invention relates to an alloy coating for use as a surface coating which can prolong the service life of members for apparatuses for high temperature applications (hereinafter referred to as "members for high temperature apparatuses"), such as gas turbine blades, jet engines, and heat-transfer tubes for boilers, a method for forming the same, and a member for high temperature apparatuses.

2. Description of the Related Art

For members for high temperature apparatuses, such as industrial gas turbine blades and heat-transfer tubes for boilers, in many cases, a coating is applied on the surface thereof to improve the heat resistance and the corrosion resistance of the members. In general, in order to improve the heat resistance, a ceramic coating called "thermal barrier coating" (hereinafter referred to as "TBC") is applied to the surface of a substrate. Such a ceramic coating, however, has the problem that the difference in coefficient of thermal expansion between the substrate metal and the ceramic is so large that, when a ceramic layer is directly formed on the surface of the substrate, the ceramic layer is likely to be separated from the interface of the ceramic layer and the substrate. In order to solve this problem, in general, as shown in FIG. 3C, an undercoat 50 formed of an alloy layer and a topcoat 52 formed of, for example, a ceramic such as $ZrO_2$ are laminated in that order on the surface of the substrate 10, to improve the adhesion of TBC 54 to the substrate 10.

Figure 3A:
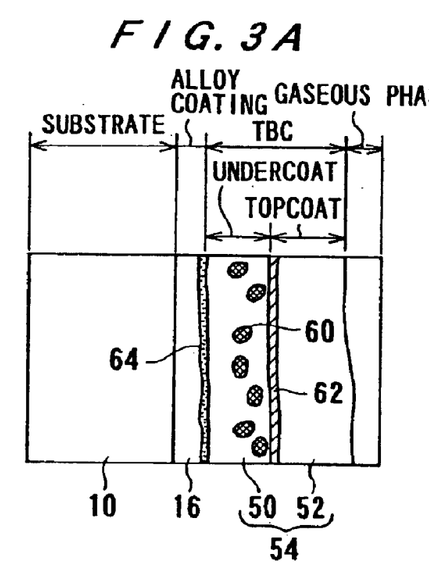
Figure 3B:
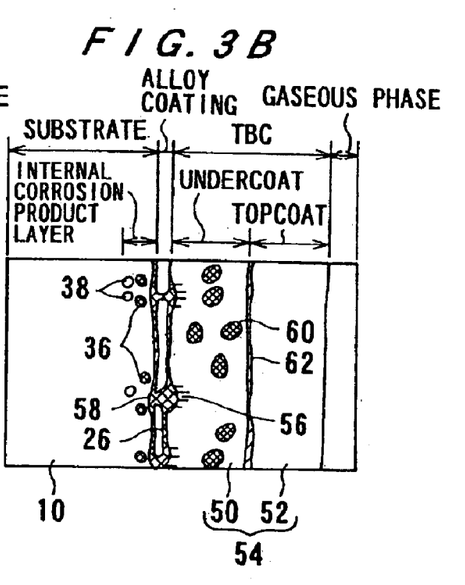
Figure 3C:
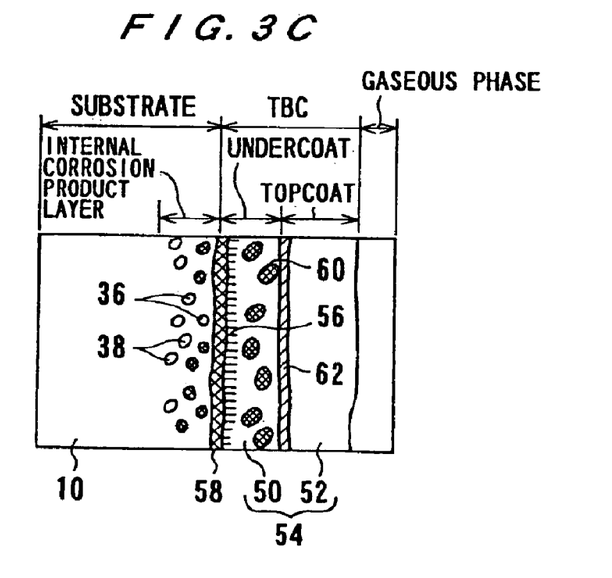

Under very high-temperature environments of about 800 to 1200° C., however, as shown in FIG. 3C, the undercoat 50 is reacted with the substrate 10 to form an Al-deficient layer 56 and a layer 58 of $Al_2O_3+NiAl_2O_4$ having poor protective properties at the interface of the undercoat 50 and the substrate 10, thus resulting in deterioration of TBC 54. Further, since TBC 54 is porous, atmosphere gas enters the inside of TBC 54 and then internally oxidizes or internally nitrides the substrate 10 to form an internal corrosion layer containing an internal oxide 36 and an internal nitride 38 within the substrate 10. For this reason, the service life of the member for high temperature apparatuses is as short as several months. This is a severe problem involved such members having a conventional ceramic coating. In a prior art technique, an attempt has been made to use a Pt—Al spray coating after Pt plating, usually, to improve the heat resistance. This technique, however, cannot attain a satisfactory improvement.

On the other hand, in order to improve the corrosion resistance, coating techniques such as diffusion coating of Cr or Al and spray coating of a high Ni-high Cr alloy have been utilized. Such coatings, however, have the drawback that when the coated member is used under a very high-temperature environment of about 800 to 1200° C., the element contributing to the corrosion resistance is very rapidly diffused and, in addition, is highly reactive. Thus, the protective coating cannot be maintained stably for a long period of time. Further, even in the temperature range of 500 to 800° C., when the member is used in a strongly corrosive environment containing, for example, chlorine (Cl) or sulfur (S), the element constituting the protective coating, such as Cr or Al, is rapidly consumed. Thus, again, the protective coating cannot be stably maintained for a long period of time, resulting in a short service life of the apparatus. For the above reasons, at the present time, the prolongation of the service life of a member for high temperature apparatuses is only made by lowering the service temperature of the apparatus while sacrificing the performance of the apparatus.

As described above, in the case of members used at high temperatures, even when TBC is applied to the members to improve the heat resistance, the TBC layer is deteriorated as a result of a reaction of TBC with the substrate during use of the members, and, in addition, the substrate is internally oxidized or internally nitrided by atmosphere gas which has penetrated into the inside of the coating. Further, even with the application of the diffusion coating of Cr or Al, the spray coating of a high Ni-high Cr alloy, etc., for improving the corrosion resistance, when the apparatus is used under an environment containing Cl, S or the like, which is highly corrosive at high temperatures, the consumption rate of the element constituting the protective coating, such as Cr or Al, is so high that a stable protective coating cannot be maintained for a long period of time.

It has now been found that rhenium (Re), iridium (Ir), niobium (Nb), tantalum (Ta), molybdenum (Mo), and tungsten (W), which are high-melting metals, when alloyed with an element for imparting corrosion resistance, such as chromium (Cr), aluminum (Al), silicon (Si), magnesium (Mg), niobium (Nb), tantalum (Ta), nickel (Ni), cobalt (Co), iron (Fe), molybdenum (Mo), iridium (Ir), tungsten (W), platinum (Pt), or rhodium (Rh), to form an alloy phase, are stable at a high temperature of 1100° C. or above, even at 1150° C. or above, and, at the same time, possess excellent oxidation resistance. Further, as a result of studies on a high temperature corrosion reaction of a Ni-base superalloy coated with a Re (Ir, Nb, Ta, Mo, and W) —X alloy (wherein X=Cr, Al, Si, Mg, Nb, Ta, Ni, Co, Fe, Mo, Pt, Rh, Ir, W or the like), it has been found that an alloy phase containing Re (Ir, Nb, Ta, Mo, and W) can inhibit the outward diffusion of Ni, Al, Ti, Ta or the like and the inward diffusion of an oxidizing agent or the like. Thus, it is expected that provision of a thin layer of this alloy based on Re (Ir, Nb, Ta, Mo, and W) on the surface of a substrate can realize the inhibition of the outward diffusion of the alloying element from the substrate and the inward diffusion of the oxidizing agent or the like from the environment, which has been unsatisfactory with the conventional Pt—Al sprayed coating, leading to less corrosion and damage in the substrate whereby the service life of the member for high temperature apparatuses would be prolonged. Further, for members on which TBC is to be applied, when the above-described coating is interposed between the substrate and TBC, the interposed coating is considered to function as an excellent diffusion barrier which can inhibit the deterioration of TBC, caused by a reaction of TBC with the substrate, and the internal corrosion of the substrate.

As coating techniques used for improving heat resistance and corrosion resistance, PVD, CVD and spray coating are known. These methods have the drawbacks that: ① control of the thickness and composition of the coating is difficult; ② a large coating apparatus is needed, and the operation is complicated; ③ the formed coating has many defects and cracks; ④ there is a number of limitations on the size and shape of a substrate to be coated (for example, coating faithfully conforming to the shape of concaves and convexes is difficult); and ⑤ the cost is high. In contrast, the technique of plating in a molten salt has the advantages that ① the thickness and composition of the coating can be easily controlled; ② the coating can be effected with ease by using a simple apparatus; ③ a dense coating having no significant defect can be formed; ④ there is few limitations on the size and shape of a substrate to be coated; and ⑤ the cost is low.

SUMMARY OF THE INVENTION

The present invention has been accomplished under the above circumstances.

It is therefore an object of the present invention to provide an alloy coating which, when applied to members for high temperature apparatuses, can prolong the service life of the members, and a method for forming the alloy coating, and a member for high temperature apparatuses, to which the alloy coating has been applied.

The alloy coating according to the present invention comprises an alloy, the alloy comprising: at least one member, as a base, selected from the group consisting of Re, Ir, Nb, Ta, Mo, and W; and at least one alloying element for imparting corrosion resistance. The alloy coating is stable at a high temperature of 1100° C. or above, even at 1150° C. or above, and, at the same time, possesses excellent corrosion resistance and can inhibit the outward diffusion of Ni, Al or the like and the inward diffusion of an oxidizing agent or the like.

Alloying elements usable for imparting corrosion resistance include, for example, Cr, Al, Si, Mg, Nb, Ta, Ni, Co, Fe, Mo, Ir, W, Pt, and Rh.

A first embodiment of the method for forming an alloy coating according to the present invention comprises of conducting plating in a molten salt containing a chloride or a fluoride of at least one member selected from the group consisting of Re, Ir, Rh, Pt, Nb, Ta, Mo, and W, and a chloride or a fluoride of at least one alloying element for imparting corrosion resistance. This method can form an alloy coating while utilizing the above-mentioned advantages of the plating in a molten salt. Further, since a dense alloy coating having no significant defect can be formed, satisfactory properties can be imparted to the conventional Pt-base and Rh-base alloy coatings which have been unsatisfactory in heat resistance and corrosion resistance.

A second embodiment of the method for forming an alloy coating according to the present invention comprises: adding at least one member selected from the group consisting of Re, Ir, Rh, Pt, Nb, Ta, Mo, and W and at least one alloying element for imparting corrosion resistance, to a supporting salt of a chloride or a fluoride; introducing chlorine gas or hydrogen chloride gas into the mixture to produce a chloride of the elements in a molten salt; and conducting plating in the molten salt. According to the second embodiment of the method for forming an alloy coating, a dense alloy coating free from defects such as cracks can be formed at lower cost.

A third embodiment of the method for forming an alloy coating according to the present invention comprises of conducting plating in a molten salt containing a first chloride or fluoride of at least one member selected from the group consisting of Re, Ir, Rh, Pt, Nb, Ta, Mo, and W, and a second chloride or fluoride of at least one alloying element for imparting corrosion resistance, wherein an alloy of at least one metal contained in the first chloride or fluoride with at least one metal contained in the second chloride or fluoride is used as an electrode. According to the third embodiment of the method for forming an alloy coating, since plating can be effected in a stable manner, a denser alloy coating can be formed and, in addition, the composition of the alloy coating can be easily controlled.

A fourth embodiment of the method for forming an alloy coating according to the present invention comprises of conducting plating in a molten salt containing a first chloride or fluoride of at least one member selected from the group consisting of Re, Ir, Rh, Pt, Nb, Ta, Mo, and W, and a second chloride or fluoride of at least one alloying element for imparting corrosion resistance, wherein at least one metal contained in the first chloride or fluoride and at least one metal contained in the second chloride or fluoride are used as electrodes to carry out alternate or simultaneous plating. According to the fourth embodiment of the method for forming an alloy coating, the composition and structure of the alloy coating can be controlled as desired.

In the first through forth embodiments of the method for forming an alloy coating according to the present invention, described above, a chloride or a fluoride of alloying element for being base, such as Re, and a chloride or a fluoride of alloying element for imparting corrosion resistance, such as Al, are used at a mole ratio from Al:Re=1:0.01 to Al:Re-1:0.5, desirably a mole ratio from 1:0.02 to 1:0.2. Plating temperature is in the range of 150° C. to 800° C. Plating time is in the range from 10 minutes to 10 hours.

In the second embodiment of the method for forming an alloy coating according to the present invention, a chloride or a fluoride of an alkali metal or alkaline metal in the periodic table is used as a supporting salt of a chloride or a fluoride.

A first embodiment of the member for high temperature apparatuses according to the present invention comprises a substrate and an alloy coating covering the surface of the substrate, the alloy coating comprising an alloy, the alloy comprising: at least one member, as a base, selected from the group consisting of Re, Ir, Nb, Ta, Mo, and W; and at least one alloying element for imparting corrosion resistance. According to the first embodiment of the member for high temperature apparatuses, a deterioration in substrate caused by corrosion and damage can be reduced by virtue of the alloy coating covering the surface of the substrate, leading to a prolonged service life of the member.

A second embodiment of the member for high temperature apparatuses according to the present invention comprises an alloy coating interposed between a substrate and a thermal barrier coating, the alloy coating comprising an alloy, the alloy comprising: at least one member, as a base, selected from the group consisting of Re, Ir, Nb, Ta, Mo, and W; and at least one alloying element for imparting corrosion resistance. According to the second embodiment of the member for high temperature apparatuses, a deterioration in thermal barrier coating, caused by a reaction of the thermal barrier coating with the substrate, and the penetration of atmosphere gas into the substrate can be prevented by virtue of the alloy coating interposed between the substrate and the thermal barrier coating, leading to a prolonged service life of the member.

A third embodiment of the member for high temperature apparatuses according to the present invention comprises a substrate and an alloy coating, the member being prepared by plating a substrate in a molten salt containing a chloride or a fluoride of at least one member selected from the group consisting of Re, Ir, Rh, Pt, Nb, Ta, Ho, and W, and a chloride or a fluoride of at least one alloying element for imparting corrosion resistance, thereby forming an alloy coating on the surface of the substrate. According to the third embodiment of the member for high temperature apparatuses, a deterioration in substrate caused by corrosion and damage can be reduced by virtue of the alloy coating, which can function as a better diffusion barrier, covering the surface of the substrate, whereby the service life of the member is prolonged.

Here a thermal barrier coating may be formed on the surface of the alloy coating. In this case, a deterioration in thermal barrier coating, caused by the reaction of the thermal barrier coating with the substrate, and the penetration of atmosphere gas into the substrate can be prevented by virtue of the alloy coating, which can function as a better diffusion barrier, interposed between the substrate and the thermal barrier coating, whereby the service life of the member is prolonged.

A fourth embodiment of the member for high temperature apparatuses according to the present invention comprises a substrate and an alloy coating, the member prepared by a method comprising the steps of: adding at least one member selected from the group consisting of Re, Ir, Rh, Pt, Nb, Ta, Mo, and W and at least one alloying element for imparting corrosion resistance, to a supporting salt of a chloride or a fluoride; introducing chlorine gas or hydrogen chloride gas into the mixture to produce a chloride of the elements in a molten salt; and plating a substrate in the molten salt thereby forming an alloy coating on the surface of the substrate.

A fifth embodiment of the member for high temperature apparatuses according to the present invention comprises a substrate and an alloy coating, the member being prepared by plating a substrate in a molten salt containing a first chloride or fluoride of at least one member selected from the group consisting of Re, Ir, Rh, Pt, Nb, Ta, Mo, and W, and a second chloride or fluoride of at least one alloying element for imparting corrosion resistance, wherein an alloy of at least one metal contained in the first chloride or fluoride with at least one metal contained in the second chloride or fluoride is used as an electrode, thereby forming an alloy coating on the surface of the substrate.

A sixth embodiment of the member for high temperature apparatuses according to the present invention comprises a substrate and an alloy coating, the member being prepared by plating a substrate in a molten salt containing a first chloride or fluoride of at least one member selected from the group consisting of Re, Ir, Rh, Pt, Nb, Ta, Mo, and W, and a second chloride or fluoride of at least one alloying element for imparting corrosion resistance, wherein at least one metal contained in the first chloride or fluoride and at least one metal contained in the second chloride or fluoride are used as electrodes to conduct alternate or simultaneous plating of the substrate, thereby forming an alloy coating on the surface of the substrate.

The above and other objects, features, and advantages of the present invention will be apparent from the following description when taken in conjunction with the accompanying drawings which illustrates preferred embodiments of the present invention by way of example.

BRIEF DESCRIPTION OF THE DRAWINGS

FIGS. 2A to 2E are diagrams showing cross-sectional microstructures of the coated Ni-base single crystal superalloys after carrying out oxidation in air at 1150° C. for 100 hr, or in air at 1100° C. for one month, wherein FIG. 2A represents the results of the experiment on the coated Ni-base single crystal superalloy shown in FIG. 1A, FIG. 2B the results of the experiment on the coated Ni-base single crystal superalloy shown in FIG. 1B, FIG. 2C the results of the experiment on the coated Ni-base single crystal superalloy shown in FIG. 1C, FIG. 2D the results of the experiment on the coated Ni-base single crystal superalloy shown in FIG. 1D, and FIG. 2E the results of the experiment on a pure (uncoated) Ni-base single crystal superalloy; and FIGS. 3A to 3C are diagrams showing cross-sectional microstructures of Ni-base single crystal superalloys after carrying out oxidation in air at 1150° C. for 100 hr, or in air at 1100° C. for one month, wherein FIG. 3A represents the results of the experiment on a Ni-base single crystal superalloy, according to another embodiment of the present invention, wherein a Re—Al alloy coating formed by molten salt plating has been interposed between a substrate and TBC, FIG. 3B the results of the experiment on a Ni-base single crystal superalloy, wherein a Re—Al alloy coating formed by sputtering has been interposed between a substrate and TBC, and FIG. 3C the results of the experiment on a Ni-base single crystal superalloy wherein TBC has been formed directly on the surface of a substrate.

DETAILED DESCRIPTION OF THE PREFERRED EMBODIMENTS

Preferred embodiments of the present invention will be described with reference to the accompanying drawings. In these embodiments, Re is used as a high-melting metal, and Al as a metallic element for imparting corrosion resistance.

Figure 1A:
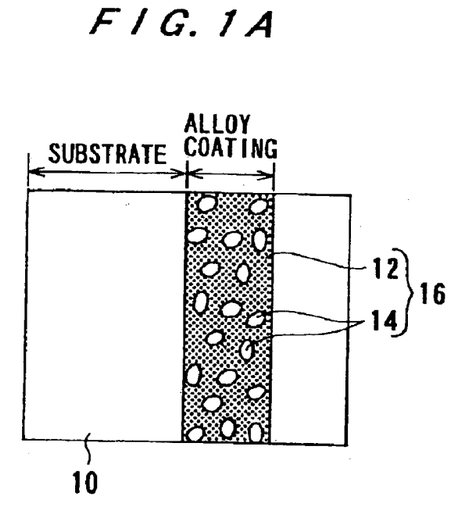
FIGS. 1A to 1D are diagrams showing cross-sectional microstructures of Ni-base single crystal superalloys which, according to different embodiments of the present invention, have been covered with a Re—Al alloy coating by plating in a molten salt (FIGS. 1A and 1B)$_1$ by sputtering (FIG. 1C), and by sputtering in combination with Al vapor diffusion (FIG. 1D)
Figure 1B:
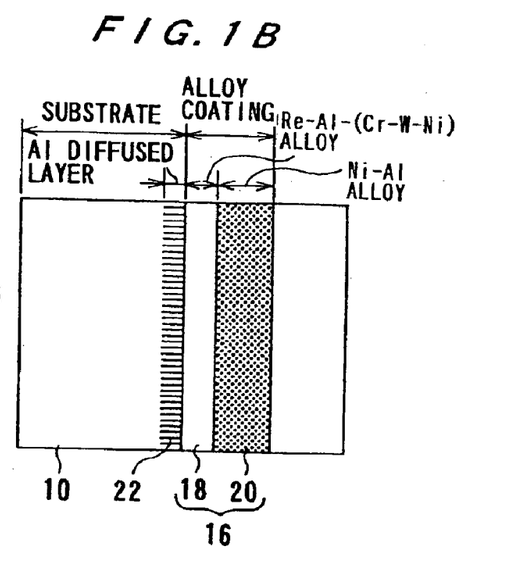

FIGS. 1A and 1B show cross-sectional microstructures of Ni-base single crystal superalloys (Ni—Co—Cr—Al—W—Ta—Ti—Re—Mo alloy) having a coating, according to different embodiments of the present invention, which can be used as a member for high temperature apparatuses. More specifically, FIG. 1A shows a coated Ni-base single crystal superalloy composed of a Ni-base single crystal superalloy (substrate) 10 and an alloy coating 16 covering the surface of the substrate 10, the alloy coating 16 being composed of a mixture of a Ni—Al alloy 12 with a Re—Al alloy 14. FIG. 1B shows a coated Ni-base single crystal superalloy composed of a substrate 10 and an alloy coating 16 covering the surface of the substrate 10, the alloy coating 16 being composed of a Re—Al alloy layer 18 and a Ni—Al alloy layer 20. In this case, Cr, W, and Ni diffused from the substrate 10 are contained in the Re—Al alloy layer, and an Al diffused layer 22 is formed at the interface between the substrate 10 and the alloy coating 16.

The coated Ni-base single crystal superalloys having cross-sectional microstructures shown in FIGS. 1A and 1B were prepared by coating the surface of the Ni-base single crystal superalloy (substrate) 10 with a Re—Al alloy by plating in a molten salt. More specifically, in the preparation of the coated Ni-base single crystal superalloy shown in FIG. 1A, Al and Re were reacted with chlorine gas in an LiCl—KCl eutectic salt to produce $AlCl_3$ and $ReCl_4$ dissolved and absorbed directly in the LiCl—KCl molten salt, and this was used as the molten salt, and the surface of the substrate 10 was plated in the molten salt under the conditions of plating temperature 500° C., current 10 mA, and plating time 10 hr. The coated Ni-base single crystal superalloy shown in FIG. 1B was prepared by plating the substrate 10 in the same manner as described above in connection with FIG. 1A, except that the plating temperature was changed to 700° C.

Figure 1C:
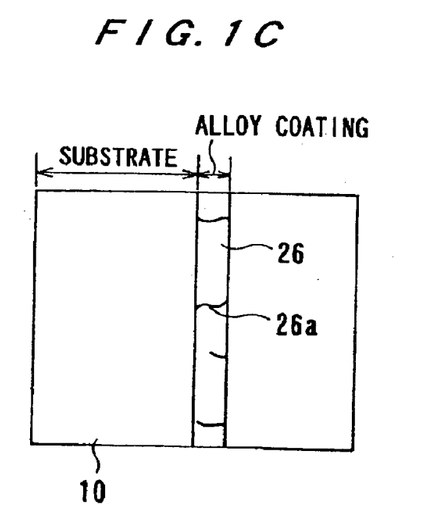
Figure 1D:
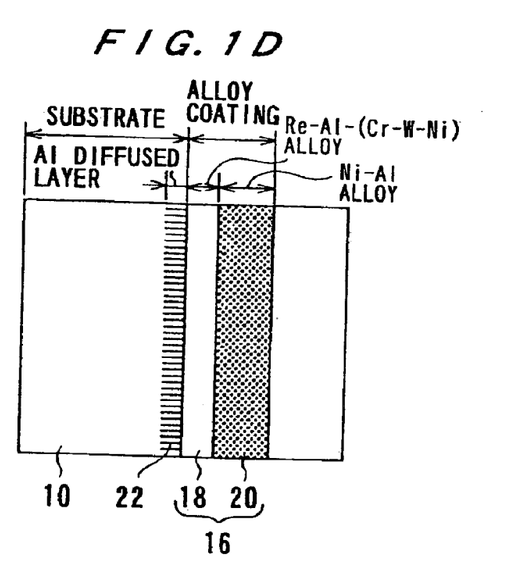

FIG. 1C shows a cross-sectional microstructure of a coated Ni-base single crystal superalloy according to another embodiment of the present invention, wherein the surface of the substrate 10 has been coated with a Re—Al alloy coating 26 by sputtering. FIG. 1D shows a cross-sectional microstructure of a coated Ni-base single crystal superalloy, wherein the surface of the substrate 10 has been coated with a Re—Al alloy coating by sputtering, followed by Al vapor diffusion. As can be seen from FIG. 1D, the formation of a Re—Al alloy coating by sputtering followed by Al vapor diffusion results in the formation of a laminated structure of a Re—Al—(Cr—W—Ni) alloy layer 18 and a Ni—Al alloy layer 20, as with the structure shown in FIG. 1B. Further, the formation of an Al diffused layer 22 is also observed at the substrate/coating interface. From FIGS. 1A to 1D, it is apparent that, when sputtering is solely adopted, the formed Re—Al alloy coating 26 have many cracks 26a (see FIG. 1C), whereas, when plating with an alloy in a molten salt is adopted, a dense Re—Al alloy coating 16 substantially free from cracks and defects can be formed (see FIGS. 1A and 1B). Further, it is apparent that, even when the alloy coating has been formed by sputtering, the subsequent Al vapor diffusion treatement can vanish the cracks.

Figure 2A:
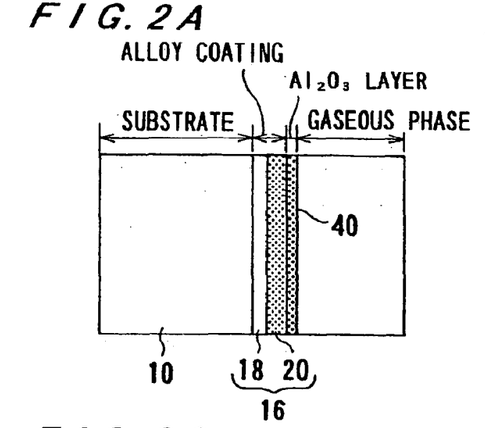
Figure 2B:
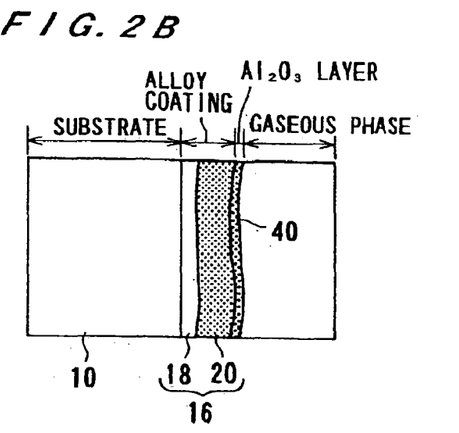
Figure 2C:
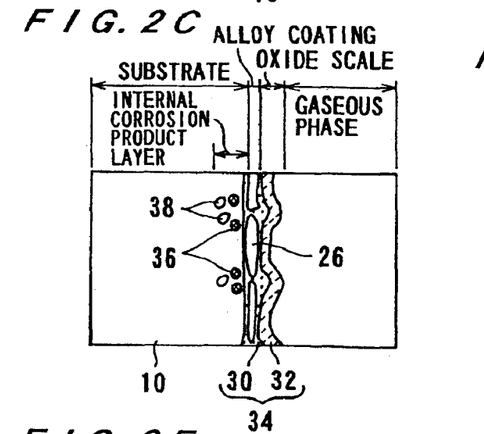
Figure 2D:
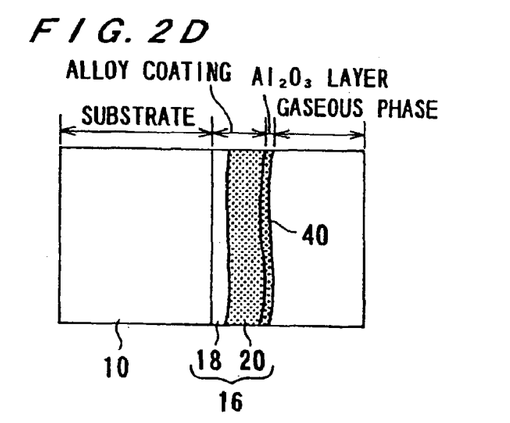
Figure 2E:
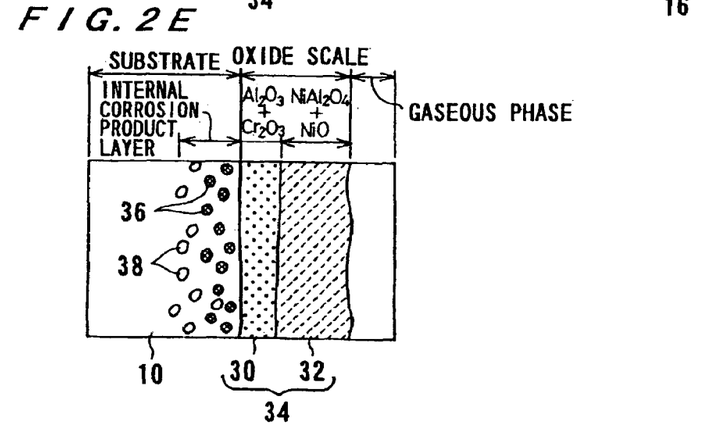

FIGS. 2A to 2E show cross-sectional microstructures, after carrying out oxidation in air at 1150° C. for 100 hr or in air at 1100° C. for one month, of the coated Ni-base single crystal superalloys having the cross-sectional microstructrues shown in FIGS. 1A to 1D and a pure Ni-base single crystal superalloy not subjected to surface treatment (coating), wherein FIG. 2A corresponds to the coated superalloy shown in FIG. 1A, FIG. 2B the coated superalloy shown in FIG. 1B, FIG. 2C the coated superalloy shown in FIG. 1C, FIG. 2D the coated superalloy shown in FIG. 1D, and FIG. 2E the pure Ni-base single crystal superalloy having no coating.

In the case of the pure Ni-base single crystal superalloy not subjected to surface treatment (FIG. 2E), a thick oxide scale 34 composed of an inner layer 30 formed of $Al_2O_3$+$Cr_2O_3$ and an outer layer 32 formed of $NiAl_2O_4$+NiO containing Ti and Ta was formed on the surface of the substrate 10 during the oxidation test. It is thus apparent that Cr, Ni, Ti, and Ta contained in the substrate 10 were outwardly diffused to form an oxide scale 34 having poor protective properties. Further, an internal corrosion product layer containing a discrete internal oxide 36 and an internal nitride 38 was formed within the substrate 10, indicating that oxygen and nitrogen in the gaseous phase were diffused into the substrate 10 to cause the internal oxidation and internal nitriding of the substrate 10.

In the case of the Ni-base single crystal superalloy having a single Re—Al alloy coating layer formed by sputtering (FIG. 2C), it is apparent that, as in the case of the pure Ni-base single crystal superalloy, an internal corrosion product layer, containing an internal oxide 36 and an internal nitride 38, and an oxide scale 34 composed of an inner layer 30 of $Al_2O_3$+$Cr_2O_3$ and an outer layer 32 of $NiAl_2O_4$+NiO were produced but locally with a reduced thickness. It is considered in this regard that, although the Re—Al alloy coating per se formed by sputtering has good heat and corrosion resistance, the presence of cracks 26a as shown in FIG. 1C, in the Re—Al alloy coating 26 allows the metallic elements and gas to diffuse through the cracks 26a and thus allows the oxidation to proceed. When an alloy coating according to the present invention is to be formed by sputtering, reducing the thickness of the alloy coating, that is, the formation of a thin alloy coating, to reduce the creation of cracks will improve the heat resistance and the corrosion resistance. On the other hand, when both sputtering and Al vapor diffusion were carried out to form the alloy coating (FIG. 2D), unlike the case of sputtering alone, there was no crack and, a thin and substantially impurity-free $Al_2O_3$ layer 40 was formed on the surface of the alloy coating during the high-temperature oxidation test. Thus, sputtering followed by Al vapor diffusion results in the formation of a dense coating having no significant cracking to improve the corrosion resistance.

In the case of the Ni-base single crystal superalloys which had been coated with a Re—Al alloy by plating in a molten salt (FIGS. 2A and 2B), a thin $Al_2O_3$ layer 40 free from Cr and Ni was formed on the surface of the alloy coating 16, indicating that the elements contained in the substrate 10 were not diffused through the alloy coating 16 into the outside of the coating 16. Further, there was no evidence indicating that the substrate 10 was internally oxidized or internally nitrided. The above test results show that the Ni-base single crystal superalloys, which have been coated with a Re—Al alloy coating 16 by plating in a molten salt, have much improved heat resistance and corrosion resistance compared to the pure Ni-base single crystal superalloy and the Ni-base single crystal superalloy on which a Re—Al alloy coating 26 has been sputtered.

A change in weight after the oxidation test in air at 1150° C. for 100 hr, or in air at 1100° C. for one month from the original weight before the oxidation test is shown in Table 1.

TABLE 1

| | Increase in weight, mg · cm$^{-2}$ |
|---|---|
| (a) | Not more than 2 |
| (b) | Not more than 2 |
| (c) | 10 to 20 |
| (d) | Not more than 2 |
| (e) | Not less than 40 |

In Table 1, (a) corresponds to a change in weight of the coated Ni-base single crystal superalloy shown in FIG. 2A, (b) a change in weight of the coated Ni-base single crystal superalloy shown in FIG. 2B, (c) a change in weight of the coated Ni-base single crystal superalloy shown in FIG. 2C, (d) a change in weight of the coated Ni-base single crystal superalloy shown in FIG. 2D, and (e) a change in weight of the pure (uncoated) Ni-base single crystal superalloy shown in FIG. 2E.

As is apparent from Table 1, for the pure Ni-base single crystal superalloy ((e) in Table 1), there was an increase in weight of not less than 40 mg.cm$^{-2}$, whereas, for the Ni-base single crystal superalloy which had been coated with a Re—Al alloy by sputtering ((c) in Table 1), the increase in weight was reduced by about 50% or more as compared with the pure Ni-base single crystal superalloy, indicating that the latter has an improved heat resistance and corrosion resistance. For the Ni-base single crystal superalloy which had been subjected to sputtering+Al vapor diffusion ((d) in Table 1), and for the Ni-base single crystal superalloys coated with a Re—Al alloy by plating in a molten salt ((a) and (b) in Table 1), the increase in weight was reduced to about one-twentieth as compound with the pure Ni-base single crystal superalloy, indicating that the increase in weight due to oxidation was much smaller.

FIG. 3A shows a cross-sectional microstructure of a coated Ni-base single crystal superalloy according to a further embodiment of the present invention, after carrying out oxidation in air at 1150° C. for 100 hr, or in air at 1100° C. for one month. The coated sample was prepared by forming an alloy coating 16 on the surface of a Ni-base single crystal superalloy (substrate) 10 by electrodeposition in a molten salt and, on the surface of the alloy coating 16, TBC 54 compared of an undercoat 50 formed of an NiC-OCrAlY alloy and a topcoat 52 formed of $ZrO_2$.

FIG. 3B shows a cross-sectional microstructure of a coated Ni-base single crystal superalloy according to a further embodiment of the present invention, after carrying out oxidation in the same manner as described above in connection with FIG. 3A. The coated superalloy sample was prepared by sputtering a Re—Al alloy coating 26 on the surface of a Ni-base single crystal superalloy (substrate) 10 and forming, on the surface of the alloy coating 26, TBC 54 in the same manner as described above. For comparison, FIG. 3C shows a cross-sectional microstructure, after oxidation in the same manner as described above, of a pure Ni-base single crystal superalloy (substrate) 10 on the surface of which TBC 54 has been directly formed.

As can be seen from FIG. 3C, for the Ni-base single crystal superalloy on which only TBC 54 has been directly formed, the formation of an internal oxide 36 and an internal nitride 38 within the substrate 10 was observed. Further, the formation of an Al-deficient layer 56 and a layer 58 of $Al_2O_3+NiAl_2O_4$ having poor protective properties at the interface between TBC 54 and the substrate 10 was also observed. This shows the progress of deterioration in TBC 54 from the interface between TBC 54 and the substrate 10. Numeral 60 designates $Al_2O_3$, and numeral 62 an $NiAl_2O_4$ layer.

On the other hand, as shown in FIG. 3B, for the Ni-base single crystal superalloy in which a Re—Al alloy coating 26 had been sputtered so as to be interposed between the substrate 10 and TBC 54 (FIG. 3B), as with the case of the formation of TBC 54 alone, an internal corrosion product layer, an Al-deficient layer 56, and a layer 58 of $Al_2O_3+NiAl_2O_4$ having poor protective properties were produced, but locally with a reduced thickness. It may be that, as with the case of the superalloy shown in FIG. 2C, the corrosion progressed through defects such as cracks created in the coating, although the Re—Al alloy coating per se has good corrosion resistance.

In contrast, for the Ni-base single crystal superalloy shown in FIG. 3A in which a Re—Al alloy coating 16 formed by plating in a molten salt has been interposed between the substrate 10 and TBC 54, there was no evidence of the internal corrosion of the substrate 10 and a dense and thin $Al_2O_3$ continuous layer 64 was formed at the interface between TBC 54 and the substrate 10. The concentration of other elements (such as Ni, Ti, and Ta) in the $Al_2O_3$ continuous layer 64 was substantially 0 (zero). There was no evidence of the formation of an Al-deficient layer and a layer of $Al_2O_3+NiAl_2O_4$ having poor protective properties. These facts show that the interposition of the Re—Al alloy coating 16 formed by plating in a molten salt between the substrate 10 and TBC 54 in a Ni-base single crystal superalloy significantly improves the oxidation resistance of the substrate 10 and, at the same time, inhibits the deterioration in TBC 54.

A change in weight after the oxidation in air at 1150° C. for 100 hr, or in air at 1100° C. for one month from the original weight before the oxidation test is shown in Table 2.

TABLE 2

| | Increase in weight, mg · $cm^{-2}$ |
|---|---|
| (a) | Not more than 2 |
| (b) | 10 to 15 |
| (c) | Not less than 30 |

In Table 2, (a) corresponds to a change in weight of the Ni-base single crystal superalloy shown in FIG. 3A, (b) a change in weight of the Ni-base single crystal superalloy shown in FIG. 3B, and (c) a change in weight of the Ni-base single crystal superalloy shown in FIG. 3C.

As is apparent from this table 2, for the Ni-base single crystal superalloy in which only TBC had been formed ((c) in Table 2), there was an increase in weight of not less than 30 mg.$cm^{-2}$. On the other hand, the Ni-base single crystal superalloy in which a Re—Al alloy coating 26 had been sputtered so as to be interposed between the substrate 10 and TBC 54 ((b) in Table 2), the increase in weight was reduced by about 50% or more as compared with the Ni-base single crystal superalloy in which only TBC had been formed. Further, for the Ni-base single crystal superalloy in which a Re—Al alloy coating 16 formed by plating in a molten salt was interposed between the substrate 10 and TBC 54 ((a) in Table 2), the increase in weight was about one-fifteenth or less as compared with the Ni-base single crystal superalloy in which only TBC had been formed, indicating that the increase in weight due to oxidation was much smaller.

The above test results show that when a Re—Al alloy coating formed by plating in a molten salt (or a Re—Al alloy coating formed by sputtering+Al vapor diffusion) is provided on the surface of the substrate, or alternatively, is interposed between TBC and the substrate, the heat resistance and corrosion resistance of a member for apparatuses can be significantly improved to thereby prolong the service life of the member.

In the above embodiments, Re is used as a high-melting metal, and Al is used as a metallic element for imparting corrosion resistance. However, Ir, Nb, Ta, Mo, and W may be used instead of Re, and Cr, Si, Mg, Nb, Ta, Ni, Co, Fe, Ir, W, Pt, Rh, Mo, etc. may be used instead of Al. Further, the formation of an alloy coating composed of a plurality of alloying elements, for example, Re—Cr—W—Al—Ni, can improve the diffusion barrier function. When the alloy coating is formed by electrodeposition in a molten salt, the base metal may preferably be at least one member selected from the group consisting of Re, Ir, W, Pt, Nb, Ta, Mo, and Rh. Ni-base multi crystal superalloy may used instead of Ni-base single crystal superalloy.

Although plating in a chloride-containing molten salt has been described above, plating may be carried out in a fluoride-containing molten salt. In some elements, an electrodeposition may be formed in a solution.

Further, plating may be carried out in a molten salt containing a first chloride or fluoride of at least one member selected from the group consisting of Re, Ir, Rh, Pt, Nb, Ta, Mo, and W, and a second chloride or fluoride of at least one alloying element for imparting corrosion resistance, wherein an alloy of at least one metal contained in the first chloride or fluoride with at least one metal contained in the second chloride or fluoride is used as an electrode. According to this embodiment, since plating can be stably carried out for a long period of time, a denser coating can be formed and, in addition, the composition of the coating can be easily controlled.

Further, plating may be carried out in a molten salt containing a first chloride or fluoride of at least one member selected from the group consisting of Re, Ir, Rh, Pt, Nb, Ta, Mo, and W, and a second chloride or fluoride of at least one alloying element for imparting corrosion resistance, wherein at least one metal contained in the first chloride or fluoride and at least one metal contained in the second chloride or fluoride are used as electrodes for alternate or simultaneous plating. According to this embodiment, the composition and structure of the alloy coating can be controlled as desired.

As described above, according to the present invention, an alloy coating can be obtained which is stable at a high temperature of 1100° C. or above, even at 1150° C. or above, and possesses excellent oxidation resistance and, in addition, can inhibit the outward diffusion of metallic elements constituting the base (substrate) metal, such as Ni, Al, Ti, and Ta, and the inward diffusion of an oxidizing agent and the like. Further, the application of the alloy coating to members for high temperature apparatuses can provide highly heat-resistant and corrosion-resistant members with prolonged service life.

Although certain preferred embodiments of the present invention have been shown and described in detail, it should be understood that various changes and modifications may be made therein without departing from the scope of the appended claims.

What is claimed is:

1. A method for forming an alloy coating, comprising a step of conducting plating in a molten salt containing a chloride or a fluoride of at least one member selected from the group consisting of Re, Ir, Rh, Pt, Ta, Mo, and W, and a chloride or a fluoride of at least one alloying element for imparting corrosion resistance, wherein said alloying element for imparting corrosion resistance is Cr, Al, Si, Mg, Ta, Ni, Co, Fe, Ir, Pt, or Rh which is not the same as said member.

2. A method for forming an alloy coating, comprising the steps of:

adding at least one member selected from the group consisting of Re, Ir, Rh, Pt, Ta, Mo, and W and at least one alloying element for imparting corrosion resistance, to a supporting salt of a chloride or a fluoride;

introducing chlorine gas or hydrogen chloride gas into the mixture to produce a chloride of said elements in a molten salt; and conducting plating in said molten salt, wherein said alloying element for imparting corrosion resistance is Cr, Al, Si, Mg, Ta, Ni, Co, Fe, Ir, Pt, or Rh which is not the same as said member.

3. A method for forming an alloy coating, comprising a step of conducting plating in a molten salt containing a first chloride or fluoride of at least one member selected from the group consisting of Re, Ir, Rh, Pt, Ta, Mo, and W, and a second chloride or fluoride of at least one alloying element for imparting corrosion resistance, wherein an alloy of at least one metal contained in said first chloride or fluoride with at least one metal contained in said second chloride or fluoride is used as an electrode, and wherein said alloying element for imparting corrosion resistance is Cr, Al, Si, Mg, Ta, Ni, Co, Fe, Ir, Pt, or Rh which is not the same as said member.

4. A method for forming an alloy coating, comprising a step of conducting plating in a molten salt containing a first chloride or fluoride of at least one member selected from the group consisting of Re, Ir, Rh, Pt, Ta, Mo, and W, and a second chloride or fluoride of at least one alloying element for imparting corrosion resistance, wherein at least one metal contained in said first chloride or fluoride and at least one metal contained in said second chloride or fluoride are used as electrodes to carry out alternate or simultaneous plating, and wherein said alloying element for imparting corrosion resistance is Cr, Al, Si, Mg, Ta, Ni, Co, Fe, Ir, Pt, or Rh which is not the same as said member.

5. A method for forming an alloy coating, comprising a step of conducting plating in a molten salt containing a first chloride or fluoride of Re, a second chloride or fluoride of at least one member selected from the group consisting of Ir, Rh, Pt, Nb, Ta, Mo, and W, and a third chloride or fluoride of at least one alloying element for imparting corrosion resistance, wherein said alloying element for imparting corrosion resistance is Cr, Al, Si, Mg, Nb, Ta, Ni, Co, Fe, Mo, Ir, W, Pt, or Rh which is not the same as said member.

6. A method for forming an alloy coating, comprising the steps of:

adding Re and at least one member selected from the group consisting of Ir, Rh, Pt, Nb, Ta, Mo, and W, and at least one alloying element for imparting corrosion resistance, to a supporting salt of a chloride or a fluoride;

introducing chlorine gas or hydrogen chloride gas into the mixture to produce a chloride of said elements in a molten salt; and conducting plating in said molten salt, wherein said alloying element for imparting corrosion resistance is Cr, Al, Si, Mg, Nb, Ta, Ni, Co, Fe, Mo, Ir, W, Pt, or Rh which is not the same as said member.

7. A method for forming an alloy coating, comprising a step of conducting plating in a molten salt containing a first chloride or fluoride of Re, a second chloride or fluoride of at least one member selected from the group consisting of Ir, Rh, Pt, Nb, Ta, Mo, and W, and a third chloride or fluoride of at least one alloying element for imparting corrosion resistance, wherein an alloy of Re and at least one metal contained in said second chloride or fluoride with at least one metal contained in said third chloride or fluoride is used as an electrode, and wherein said alloying element for imparting corrosion resistance is Cr, Al, Si, Mg, Nb, Ta, Ni, Co, Fe, Mo, Ir, W, Pt, or Rh which is not the same as said member.

8. A method for forming an alloy coating, comprising a step of conducting plating in a molten salt containing a first chloride or fluoride of Re, a second chloride or fluoride of at least one member selected from the group consisting of Ir, Rh, Pt, Nb, Ta, Mo, and W, and a third chloride or fluoride of at least one alloying element for imparting corrosion resistance, wherein Re and at least one metal contained in said second chloride or fluoride, or at least one metal contained in said third chloride or fluoride are used as electrodes to carry out alternate or simultaneous plating, and wherein said alloying element for imparting corrosion resistance is Cr, Al, Si, Mg, Nb, Ta, Ni, Co, Fe, Mo, Ir, W, Pt, or Rh which is not the same as said member.

* * * * *